United States Patent [19]
Cox, Jr.

[11] 3,881,249
[45] May 6, 1975

[54] CABLE STRIPPER

[75] Inventor: John A. Cox, Jr., Genoa, Ill.

[73] Assignee: Ideal Industries, Inc., Sycamore, Ill.

[22] Filed: June 5, 1974

[21] Appl. No.: 476,511

[52] U.S. Cl. .............................. 30/90.7; 81/9.5 C
[51] Int. Cl. ............................................. H02g 1/12
[58] Field of Search .......... 81/9.5 R, 9.5 C; 30/90.1, 30/90.6, 90.7, 92, 92.5

[56] References Cited
UNITED STATES PATENTS
3,483,617  12/1969  Krampe............................ 81/9.5 R FOREIGN PATENTS OR APPLICATIONS
893,672  10/1953  Germany .......................... 30/90.1

Primary Examiner—Al Lawrence Smith
Assistant Examiner—Roscoe V. Parker
Attorney, Agent, or Firm—Kinzer, Plyer, Dorn & McEachran

[57] ABSTRACT

A tool for stripping the insulation from electrical cables and the like. An elongated handle has a generally circular cable-receiving zone on one end with a rigid frame overlying and defining part of the cable-receiving zone. The handle and frame are spring-biased toward each other along the axis of the handle for firmly holding a cable in the cable-receiving zone. A cutting edge is adjustably mounted in the cable-receiving zone at an angle to its pivotal axis about which it is free to rotate.

7 Claims, 4 Drawing Figures

3,881,249

CABLE STRIPPER

SUMMARY OF THE INVENTION

The present invention relates to cutting tools and more particularly to cable strippers for removing the insulation from wires, cables and the like.

A primary purpose of the invention is to provide a cable stripper in which a cutting edge, disposed at an angle to its pivotal axis, protrudes into the insulation of a cable firmly held within the cable-receiving zone at one end of the stripper handle so that as the handle moves along the outside of the cable, a force, other than the tangential force which resists cutting, will facilitate the cutting operation.

Another purpose is a cable stripper in which the cutting edge is disposed at an inward angle to its pivotal axis so that as the handle is moved along the surface of the cable, a component of force tends to pull the blade into the insulation thereby insuring a thorough cut of uniform depth.

Another purpose is to provide a cable stripper which is capable of making center or end strips on most types of common electrical cable quickly, easily and accurately.

Another purpose is to provide a cable stripper which may be used to neatly cut the outer sheathing from a cable without damaging the inner conductors or insulation.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENTS

Figure 1:
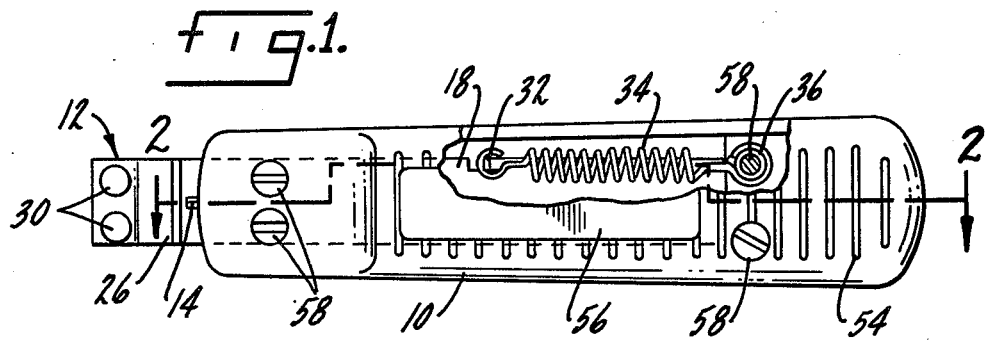
FIG. 1 is a partially fragmented front plan view, partly in section, of a cable stripper.
Figure 2:
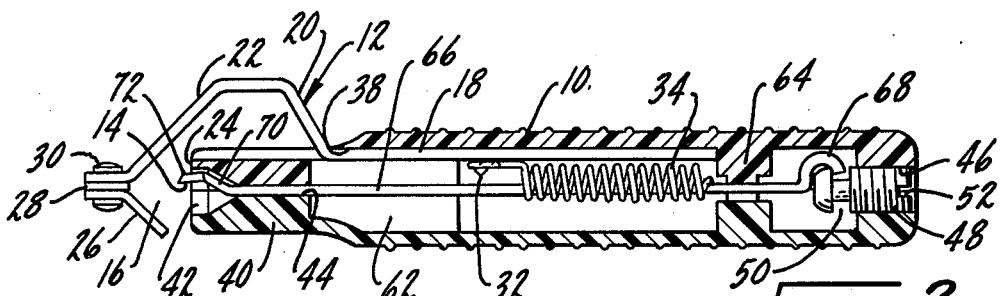
FIG. 2 is a side section view taken substantially along line 2—2 of FIG. 1.

Referring to FIGS. 1 and 2, the cable stripper of the present invention includes an elongated handle 10, a frame 12 for holding a cable against the end of the handle 10 and a cutting edge 14 for cutting through the insulation of a cable as the handle 10 is moved about the surface of a cable.

Figure 3:
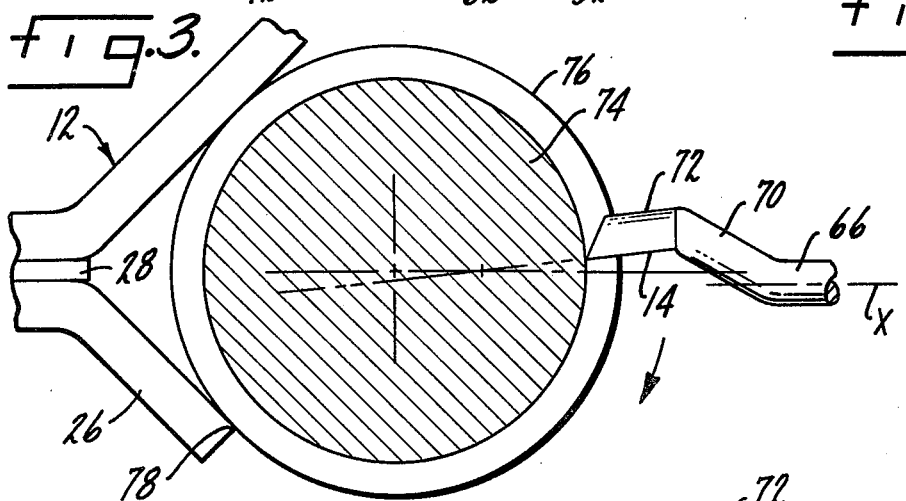
FIG. 3 is a side section view, on an enlarged scale, showing the relative position of the cutting edge penetrating the insulation of a cable held in the cable-receiving zone.

The frame 12 overlies and defines a part of a generally circular cable-receiving zone 16 at one end of the handle 10, best shown in FIG. 3. Being formed from a strip of rigid material, the frame 12 includes a generally flat portion 18 which is slidably mounted within the handle 10, an offset portion 20 bent away from the front surface of the handle 10, a cover portion 22 bent back toward the front surface of the handle and extending beyond and partially across the top end 24 of the handle 10 and a small end portion 26 extending toward the back side of the handle at generally the same angle to the axis of the handle as the cover portion 22. A pair of rivets 30 rigidly connects the end portion 26 to the cover portion 22 with a spacer plate 28 between them.

A small tang 32 is formed in the flat portion of the frame intermediate its length for engaging the top end of a tension spring 34. The bottom end of the spring 34 is engaged by a small cylindrical extension 36 integral with the inner surface of the handle 10. The flat portion 18 of the frame 12 extends through a transverse slot 38 in the front wall of the handle 10 and is slidably adjustable therethrough for raising and lowering the frame in relation to the top surface 24 of the handle 10.

The handle 10 forms an enclosure which has a solid upper portion 40 having a shallow circular hole 42 therein. Below the hole 42, its inner surface tapers conically inward to form the top end portion of a narrow opening 44 through the upper solid portion 40 of the handle 10. The purpose of this opening 44, which extends substantially through the length of the handle 10, is explained hereinbelow. An internally threaded bore 46 extends through the bottom surface of the handle 10 for receiving a screw member 48. The screw 48 has a crowned top surface and an annular recess 50 adjacent its upper end, the purpose of which is explained hereinbelow. A radial slot 52 is provided in the bottom surface of the screw 48 for turning the screw within the bore 46. A plurality of thin raised transverse gripping surfaces 54 may be formed along the front and back surfaces of the handle excluding a flat generally rectangular area 56 on the front surface of the handle 10 reserved for identification. The handle is formed of a stiff but resilient material preferably in two parts joined along the lateral and end surfaces of the handle 10 and secured together by means of four bolts 58. The interior of the handle is generally an open chamber 62 extending from the solid upper portion 40 of the handle to the top of the bore 46. A solid integral cross member 64 of the handle 10 extends transversely across the chamber 62 adjacent its lower end for supporting the lower pair of bolts 58 and further defining the narrow opening 44.

Cutting edge 14 is formed along the free end portion of a long wire-like cutting blade 66 which is rotatably mounted within the narrow opening 44 about an axis X extending through the handle 10. The lower end 68 of the blade 66 is bent normal to the axis of the blade and then hooked downward in a semi-circular shape for engaging the crowned head and annular recess 50 of the screw 48. The position of the blade 66 within the handle 10 can thus be adjusted longitudinally by means of rotation of the screw 48. Since the blade 66 is mounted within the narrow opening 44, the pivotal axis of the blade 66 is the axis of the narrow opening 44, which in turn is parallel to the axis of the handle 10. The top of the blade 66 has a short offset portion 70 which is bent away from the axis of the blade 66 and a top end portion 72 which is disposed at an angle to the pivotal axis. The cutting edge 14 is formed along the inner surface of the top end portion 72 of the blade 66 such that it faces the pivotal axis of the blade, shown best in FIG. 3.

The use, operation and function of the invention are as follows:

Referring to FIG. 3, a cable 74 is held within the cable-receiving zone 16 by the frame 12. The cutting edge 14 is longitudinally adjusted by rotation of the screw 48 so that it penetrates into the cable-receiving zone 16 only as deep as the thickness of the insulation 76 of the cable 74. This is accomplished by rotating the screw 48 until the distance from the top surface 24 of the handle to the tip of the cutting edge 14 is equal to the thickness of the insulation 76. A circular cut can then be made in the cable 74 by rotating handle 10 about the cable 74 along its circumference. An axial cut can then be made simply by pulling the handle longitudinally along the cable.

Figure 4:
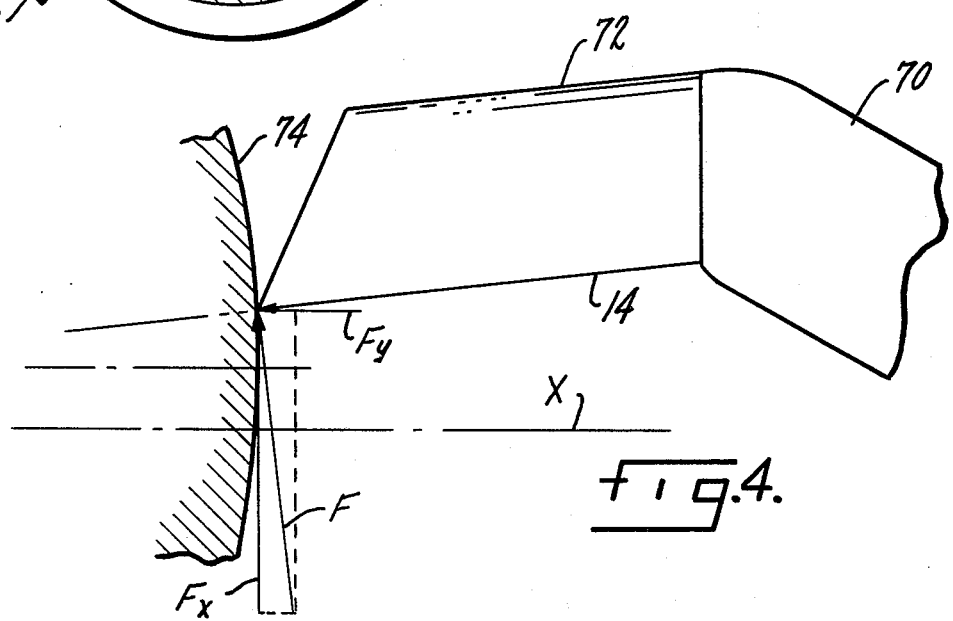
FIG. 4 is an enlarged diagrammatic vector diagram.

The resultant force F acting against and normal to the cutting edge 14 of the blade 66 as it makes a circular cut is diagrammatically shown in FIG. 4 relative to the pivot axis X. This resultant force F may be resolved into two component forces, respectively normal and parallel to the pivotal axis X. The component Fx which is directed along a line normal to the pivotal axis X tends to resist the cutting action of the blade. The other component Fy is directed along a line parallel to the pivotal axis X. With the cutting edge disposed at an inward angle to its pivotal axis, as shown in FIG. 3, the parallel component Fy is directed inward toward the cable and away from the handle so that a plow-type action is provided in which the resultant force tends to pull the blade into the insulation to the preset depth. This insures a thorough cut of uniform depth whch is not varible upon the operator's skill.

The center of the cable receiving zone 16 may be slightly offset from the pivotal axis of the blade, preferably by a distance less than the offset of the cutting edge from the pivotal axis. This will allow the cutting edge to enter the insulation at a point close to the center of the area of contact between the cable and handle. Such a cut at the point of contact will more likely result in a cut of uniform depth than one made at a point laterally offset therefrom where the cable has more freedom to flex and deform.

Whereas there has been shown and described an operative form of the invention, it should be understood that this showing and description are to be taken in an illustrative or diagrammatic sense only. There are many modifications in and to the invention which will be apparent to those skilled in the art and which will fall within the scope and spirit of the invention.

The embodiments of the invention in which an exclusive property or privilege is claimed are defined as follows:

1. In a tool for stripping the insulation from cable and the like, an elongated handle with a generally circular cable-receiving zone on one end thereof, a frame overlying and defining a part of the cable-receiving zone with the handle and frame being spring-biased toward each other so that a cable in the cable-receiving zone will be firmly held against the end of the handle, and a cutting edge adjustably mounted in the cable-receiving zone with the cutting edge being free to rotate about a pivotal axis extending longitudinally through the handle and said cutting edge being along a line disposed at an angle that intersects the pivotal axis.

2. The structure of claim 1 further characterized in that the cutting edge is formed along the free end portion of a cutting blade, with the blade being rotatably mounted along said pivotal axis, and with the free end portion being laterally offset from said pivotal axis which the cutting edge faces, so that the cutting edge may swivel about the pivotal axis and automatically align itself in the direction of motion of the tool for both circular cuts around the cable and axial cuts longitudinally along the cable.

3. The structure of claim 2 further characterized in that the pivotal axis is parallel to the axis of the handle.

4. The structure of claim 1 further characterized in that the generally circular cable-receiving zone on one end of the handle is defined and positioned such that its center is laterally offset from the pivotal axis.

5. The structure of claim 2 further characterized in that the blade is mounted on the handle and projects therefrom beyond the said one end so that its cutting edge is disposed at least partially within the cable-receiving zone.

6. The structure of claim 2 further characterized in that the blade is adjustably mounted along said pivotal axis such that it can be fixed in a number of positions so that the cutting edge will project into the cable-receiving zone by varying amounts depending on the size of the cable being stripped.

7. The structure of claim 1 further characterized in that the cutting edge is disposed at an acute angle to the pivotal axis so that as the handle is rotated about a cable there will be a component of force tending to bias the cutting edge toward the cable.

* * * * *